United States Patent
Nakamura

(10) Patent No.: US 8,358,914 B2
(45) Date of Patent: Jan. 22, 2013

(54) RECORDING CONTROLLING DEVICE, RECORDING CONTROLLING METHOD, PROGRAM USED THEREIN AND RECORDING DEVICE

(75) Inventor: Ryuichi Nakamura, Saitama (JP)

(73) Assignee: Sony Corporation (JP)

(*) Notice: Subject to any disclaimer, the term of this patent is extended or adjusted under 35 U.S.C. 154(b) by 437 days.

(21) Appl. No.: 12/454,054

(22) Filed: May 12, 2009

(65) Prior Publication Data

US 2009/0285565 A1 Nov. 19, 2009

(30) Foreign Application Priority Data

May 15, 2008 (JP) ................ P2008-128769

(51) Int. Cl.
*H04N 5/917* (2006.01)
(52) U.S. Cl. ............... 386/331; 386/333
(58) Field of Classification Search .......... 386/331, 386/333
See application file for complete search history.

(56) References Cited

U.S. PATENT DOCUMENTS

| | | | |
|---|---|---|---|
| 5,852,474 A | 12/1998 | Nakagaki et al. | |
| 6,618,058 B1 | 9/2003 | Yasui | |
| 6,965,723 B1 | 11/2005 | Abe et al. | |
| 7,084,908 B2 | 8/2006 | Suda | |
| 2004/0148378 A1* | 7/2004 | Koide et al. | 709/223 |
| 2004/0247284 A1 | 12/2004 | Yamasaki | |
| 2007/0002386 A1* | 1/2007 | Iijima | 358/296 |
| 2007/0031141 A1* | 2/2007 | Tanaka | 396/287 |

FOREIGN PATENT DOCUMENTS

| | | |
|---|---|---|
| JP | 06-030369 A | 2/1994 |
| JP | 6-110943 A | 4/1994 |
| JP | 09-065225 A | 3/1997 |
| JP | 11-146336 A | 5/1999 |
| JP | 2000-348469 A | 12/2000 |
| JP | 2001-128168 A | 5/2001 |
| JP | 2002-232834 A | 8/2002 |
| JP | 2006-324722 A | 11/2006 |
| JP | 2006-340381 A | 12/2006 |
| WO | WO-2004/021701 A1 | 3/2004 |

* cited by examiner

*Primary Examiner* — Jamie Atala
(74) *Attorney, Agent, or Firm* — Lerner, David, Littenberg, Krumholz & Mentlik, LLP

(57) ABSTRACT

A recording controlling device includes a display controlling unit configured to display moving image data delayed using a delay circuit on a first display unit and a recording controlling unit configured to record the moving image data delayed using the delay circuit on a recording medium in accordance with an operation instruction given on the basis of content displayed on the first display unit.

8 Claims, 10 Drawing Sheets

RECORDING CONTROLLING DEVICE, RECORDING CONTROLLING METHOD, PROGRAM USED THEREIN AND RECORDING DEVICE

BACKGROUND OF THE INVENTION

1. Field of the Invention

The present application claims priority from Japanese Patent Application No. JP 2008-128769 filed in the Japanese Patent Office on May 15, 2008, the entire content of which is incorporated herein by reference.

The present invention relates to a recording controlling device, a recording controlling method, a program used therein and a recording device configured to record moving image data on a recording medium.

2. Description of the Related Art

In general, in a video camera, an operation to record a captured moving image on a recording medium is performed while a user is visually confirming an image which is being currently captured using a display. Then, in the video camera, a process of recording moving image data on a recording medium such as a hard disk drive is started in accordance with a control signal generated on the basis of an instruction given for the above mentioned operation.

In a video camera, a user instructs performance of a process of recording a captured moving image on a recording medium while the user is visually confirming the image to be captured, so that it may take much time until the process of recording the captured moving image on the recording medium is actually started after the recording operation has been initiated by the user. As a result, it may sometimes occur that the head part of a captured moving image that a user wishes to record on the recording medium is not recorded.

In order to solve the problem as mentioned above, there is available a video camera configured to prevent a captured moving image that a user wishes to record on a recording medium from being not recorded by continuously recording a captured moving image on the recording medium regardless of whether the recording operation has been initiated by the user.

In addition, Japanese Laid-Open Patent Publication No. 06-30369 discloses a video camera configured such that captured moving image data is time-delayed using a delay circuit for a predetermined time period, thereby to start a process of recording the moving image data on a recording medium, beginning with images which have been captured before in the predetermined time period, when the operation is performed by a user.

SUMMARY OF THE INVENTION

In the case that a recording process of continuously recording a captured moving image on a recording medium has been performed as mentioned above, it takes much time to find a scene that a user wishes to record upon reproduction of a moving image and hence favorable operability may not be attained. In addition, in order to realize the recording process as mentioned above, increases in capacity of a recording medium and a battery are unavoidable. As a result, the size of a device used and the cost involved may be increased.

In the video camera disclosed in Japanese Patent Laid-Open Publication No. 06-30369, it is difficult for the user to instruct to start the process of recording the captured moving image on the recording medium while the user is visually confirming the head of the captured moving image to be recorded on the recording medium.

The present invention has been conceived of in view of the above mentioned circumstances. Therefore, it is desirable to provide a recording controlling device, a recording controlling method, a program used therein and a recording device configured to realize sure recording of moving image data to be recorded on a recording medium in accordance with an operation instruction given from a user.

As means for solving the above mentioned problems, according to an embodiment of the present invention, there is provided a recording controlling device including a display controlling unit configured to display moving image data delayed using a delay circuit on a first display unit and a recording controlling unit configured to record the moving image data delayed using the delay circuit on a recording medium in accordance with an operation instruction given on the basis of content displayed on the first display unit.

According to an embodiment of the present invention, there is provided a recording controlling method including the steps of displaying delayed moving image data and recording, on a recording medium, the delayed moving image data in accordance with an operation instruction given on the basis of displayed content.

According to an embodiment of the present invention, there is provided a program configured to make a computer execute a recording controlling method including the steps of displaying delayed moving image data and recording, on a recording medium, the delayed moving image data in accordance with an operation instruction given on the basis of displayed content.

According to an embodiment of the present invention, there is provided a recording device including a recording unit configured to record moving image data on a recording medium, a delaying unit configured to delay moving image data input as an object to be recorded on the recording medium, a display controlling unit configured to control to display the moving image data delayed using the delaying unit on a first display unit and a recording controlling unit configured to control the recording unit to record, on the recording medium, moving image data delayed using the delay unit in accordance with an operation instruction given from a user in accordance with a display result displayed on the first display unit.

According to an embodiment of the present invention, moving image data to be recorded on a recording medium and delayed using a delay circuit is displayed on a first display unit and the moving image data delayed using the delay circuit is recorded on the recording medium in accordance with an operation instruction given from a user in accordance with a display result displayed on the first display unit. As a result, the moving image data to be recorded is confirmed by the user and the moving image data to be recorded in accordance with the operation instruction given from the user is recorded on the recording medium with certainty.

DESCRIPTION OF THE PREFERRED EMBODIMENTS

Next, preferred embodiments of the present invention will be described in detail with reference to the accompanying drawings.

Figure 1:
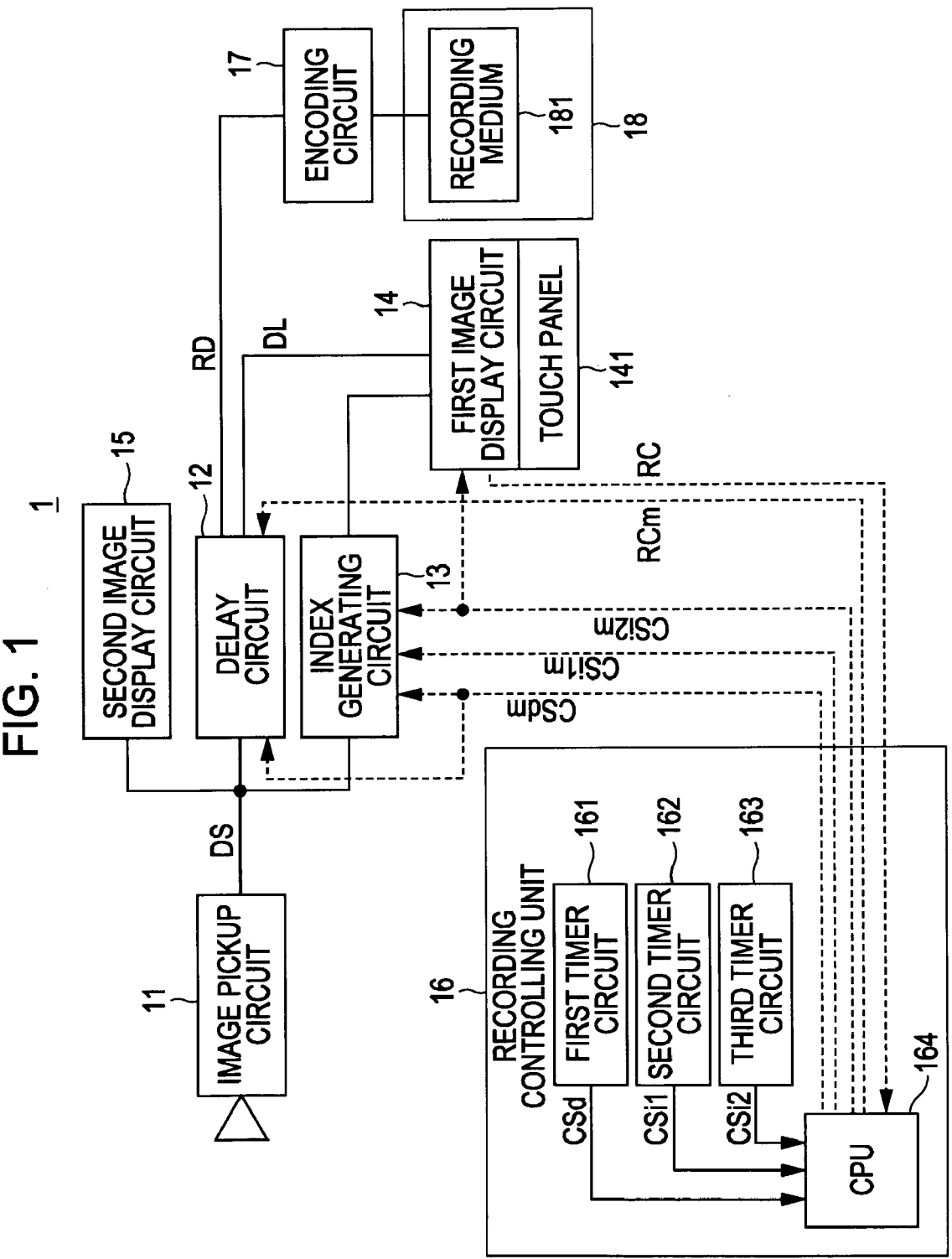
FIG. 1 is a diagram showing a structure of a video camera into which a recording controlling device according to an embodiment of the present invention is incorporated.

A recording controlling device according to an embodiment of the present invention is a controlling device of the type of recording moving image data on a recording medium and is incorporated into a video camera 1 configured to capture a moving image of a subject to generate moving image data, for example, as shown in FIG. 1. Next, preferred embodiments of the present invention will be described in detail with reference to the accompanying drawings using the video camera 1 by way of example.

The video camera 1 includes an image pickup circuit 11 configured to output moving image data DS generated from a captured moving image, a delay circuit 12 configured to time-delay the moving image data DS output from the image pickup circuit 11 and an index generating circuit 13 configured to generate still image indexes from the moving image data DS output from the image pickup circuit 11. The video camera 1 also includes a first image display circuit 14 configured to display the delayed moving image DL output with a time delay from the delay circuit 12 and the still image indexes output from the index generating circuit 13 and a second image display circuit 15 configured to display the moving image data DS output from the image pickup circuit 11. The video camera 1 further includes a recording controlling unit 16 configured to control recording of moving image data, an encoding circuit 17 configured to compressively encode moving image data RD output with a time delay from the delay circuit 12 and a recording unit 18 configured to record the moving image data which has been compressively encoded using the encoding circuit 17 on a recording medium 181.

The image pickup circuit 11 generates moving image data DS from a captured image obtained by capturing a moving image of a subject and supplies the generated moving image data DS to the delay circuit 12, the index generating circuit 13 and the second image display circuit 15.

The delay circuit 12 temporarily stores the moving image data DS output from the image pickup circuit 11 in a memory circuit constituted by, for example, a shift register to time-delay the moving image data DS. The delay circuit 12 supplies the delayed moving image data as a delayed moving image DL to the first image display circuit 14 in accordance with a control signal CSdm sent from the recording controlling unit 16 which will be described later. The delay circuit 12 also supplies delayed moving image data RD to the encoding circuit 17 in accordance with a control signal RCm sent from the recording controlling unit 16 which will be described later.

Figure 2:
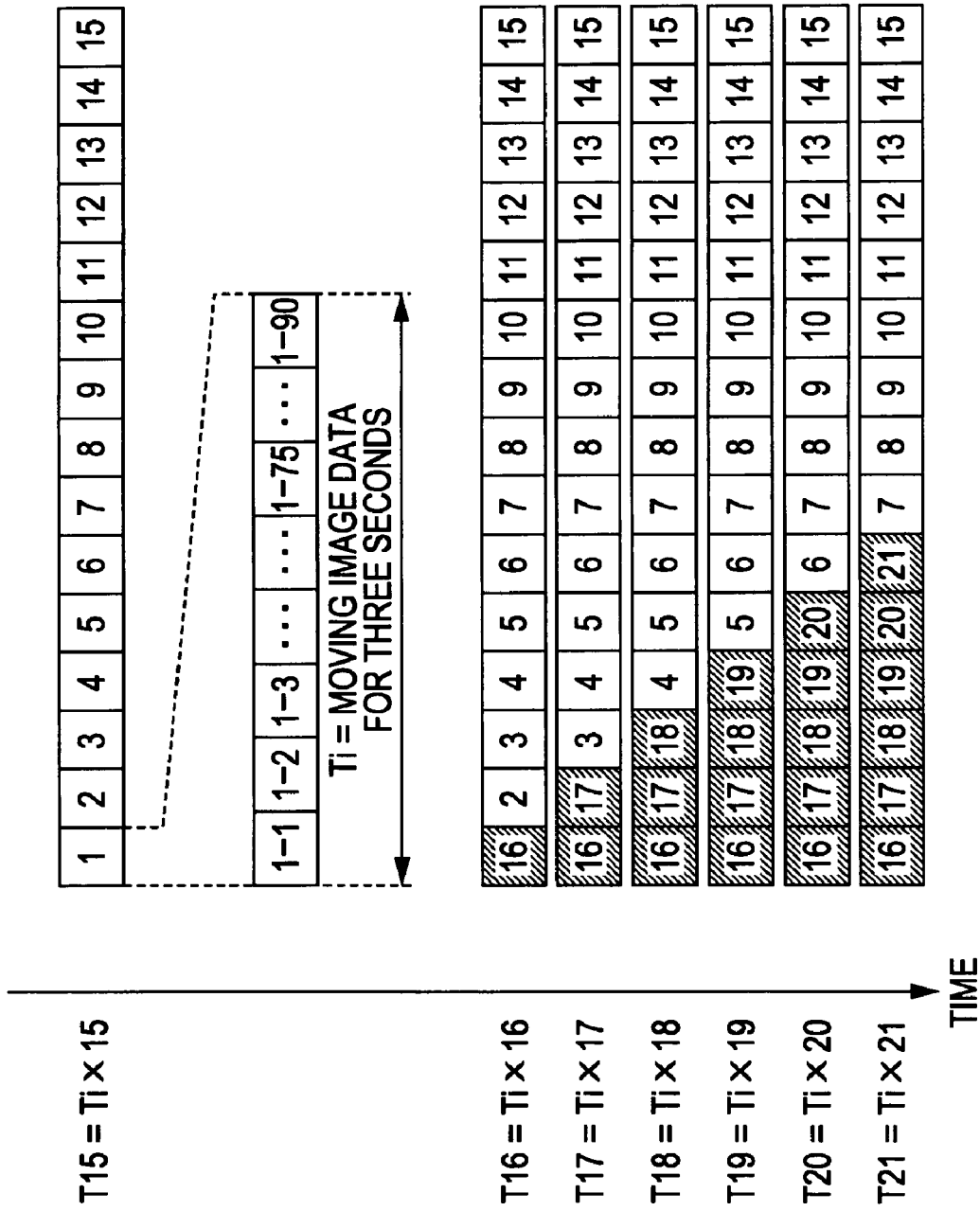
FIG. 2 is a diagram illustrating a process of managing moving image data concerning to a delay circuit.

The delay circuit 12 manages image data output from the image pickup circuit 11 in units of blocks of a plurality of pictures as shown in FIG. 2. For example, the delay circuit 12 manages moving image data obtained in a time Ti (for example, Ti=3.0 [sec.]) which will be described later in units of blocks, on the basis of a time at which inputting of the moving image data DS from the image pickup circuit 11 is started. FIG. 2 shows an example in which a frame rate of moving image data is set as 30 [frame/sec] and the 1-1$^{st}$ to 1-90$^{th}$ moving image data have been input "firstly" as one block, on the basis of the time at which inputting of the moving image data is started. For the sake of convenience, it is supposed that a memory capacity managed by the delay circuit 12 is sufficient to store moving image data of at least 15 blocks in terms of the above mentioned units of blocks. That is, it is supposed that the memory capacity managed by the delay circuit 12 is designed to store data of 15 or more blocks actually in consideration of variations in data size of respective pictures.

As shown in FIG. 2, the delay circuit 12 manages moving image data to be input for a certain amount of time, for example, from a time T15 (=Ti×15) to a time T21 (=Ti×21), on the basis of the time at which inputting of the moving image data DC output from the image pickup circuit 11 is started, using respective memory areas having a ring buffer configuration as follows.

That is, at the elapsed time T15, the delay circuit 12 manages moving image data of the first to 15$^{th}$ blocks.

Next, at an elapsed time T16, the delay circuit 12 overwrites newly input moving image data of the 16$^{th}$ block on the memory area where the moving image data of the first block is managed.

At an elapsed time T17 and succeeding elapsed times, the delay circuit 12 sequentially overwrites newly input moving image data on a memory area where the most formerly input moving image data is managed, as in the case with the operation performed at the elapsed time T16. In the example shown in FIG. 2, areas indicated by shaded solid lines correspond to memory areas where moving image data have been overwritten.

The delay circuit 12 holds time-delayed moving image data with the use of the limited memory capacity by managing moving image data using memory areas having the ring buffer configuration as mentioned above.

Due to variations in the data size of moving images, for example, in the case that the animated image data of the 16$^{th}$ block is to be stored in a process of overwriting moving image data in units of blocks as mentioned above, not only the moving image data of the first block, but also the moving image data of the second block may be overwritten. However, the delay circuit 12 has a memory capacity sufficient to record moving image data of at least 15 blocks in order to prevent the moving image data of the second block from being overwritten. Thus, the delay circuit 12 manages moving image data in a state that a memory area where moving image data to be recorded is stored is sufficiently separated from a memory area where moving image data to be overwritten is stored so that both memory areas are not superposed on each other.

In addition to temporary storage of moving image data in a memory circuit, the delay circuit 12 manages a correlative relation between an elapsed time Tk which has elapsed from the time at which inputting of moving image data is started and each block held therein by allocating addresses thereto, for example, in units of blocks.

Figure 3:
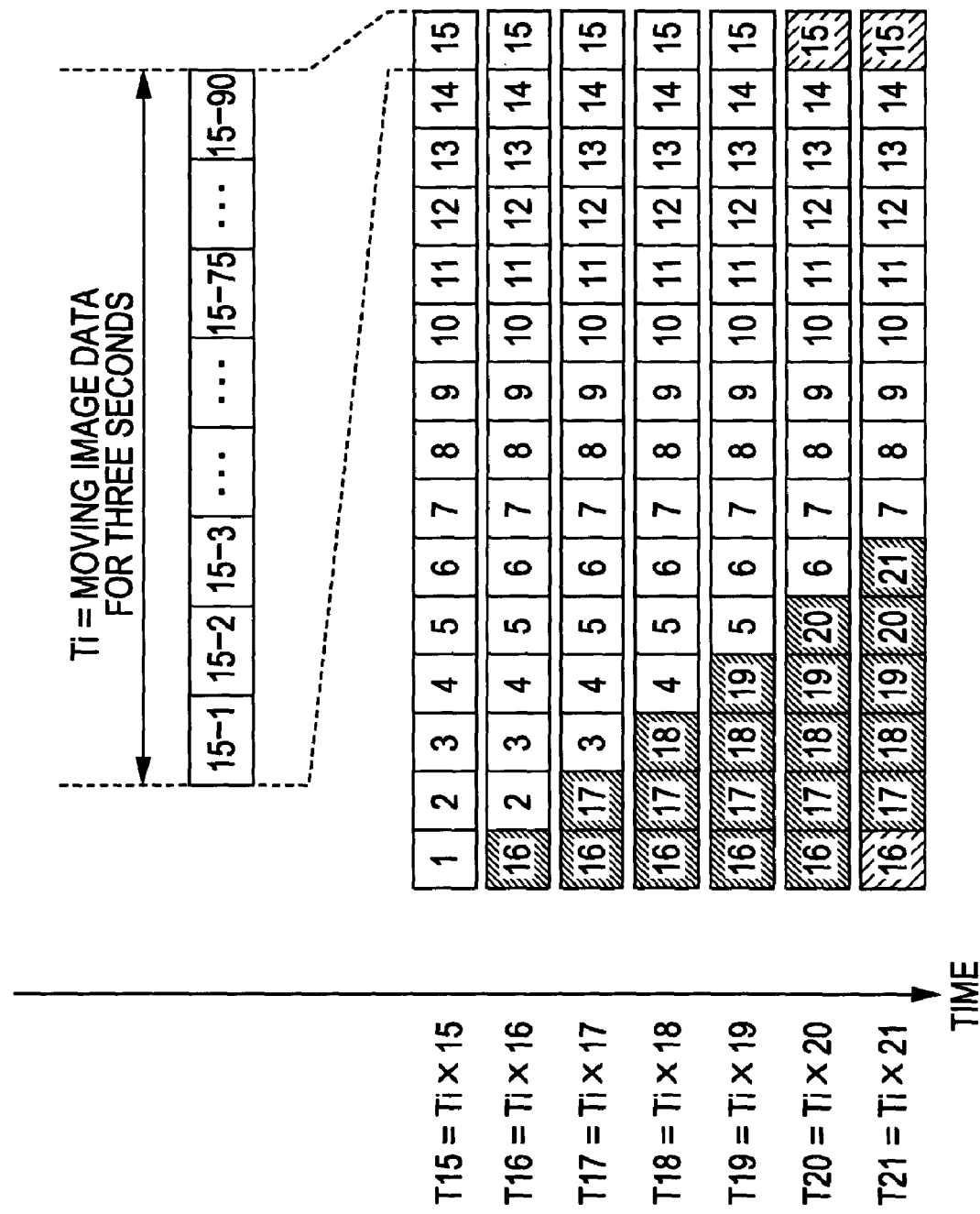
FIG. 3 is a diagram illustrating a process to start outputting of moving image data concerning to the delay circuit.

When a control signal for instructing starting of recording is input from the recording controlling unit 16 which will be described later, the delay circuit 12 performs processing as follows. For example, it is supposed that an operation to start data recording is to be performed, beginning with the moving image data of the 15$^{th}$ block, while the elapsed time Tk which has elapsed from the time at which inputting of moving image data is started using the delay circuit 12 is shifting from the time T15 to the time T16 (=Ti×16). In cooperation with the above mentioned operation, the delay circuit 12 starts outputting the moving image data of the 15$^{th}$ block to the encoding circuit 17 after a time (Ti×5) has elapsed from the time T15, that is, when the elapsed time Tk reaches a time T20 as shown in FIG. 3. In the example shown in FIG. 3, areas indicated by shaded broken lines correspond to memory areas of moving image data to be output to the encoding circuit 17.

In the delay circuit 17, even if a process of sequentially overwriting moving image data is performed after the time (Ti×5) has elapsed from the time T15, the moving image data of the 15$^{th}$ block to be recorded may be output without being overwritten. The reason therefor lies in that the memory circuit incorporated into the delay circuit 12 has the ring buffer configuration in which moving image data of at least 15 blocks are held.

Figure 4:
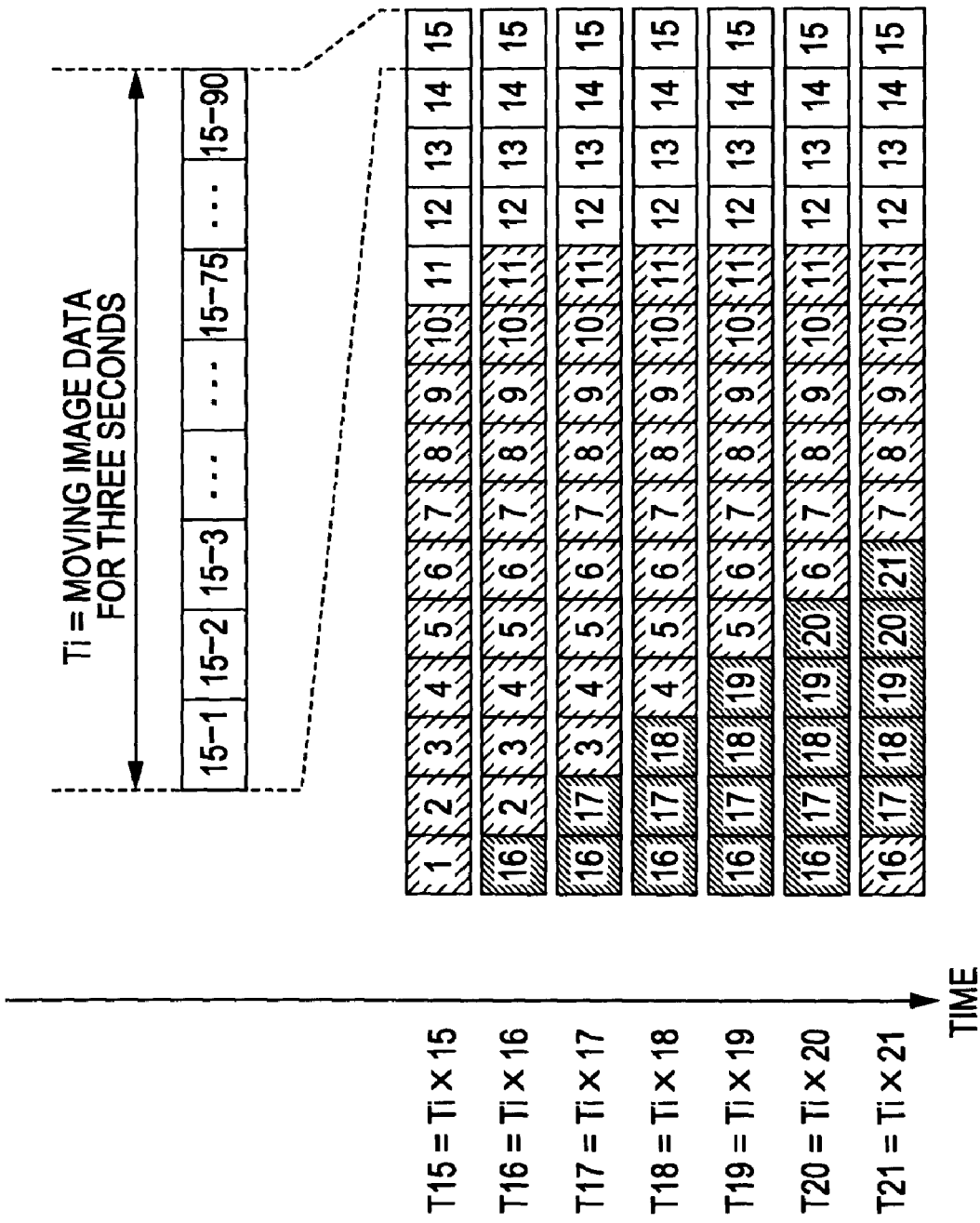
FIG. 4 is a diagram illustrating a process to terminate outputting of moving image data concerning to the delay circuit.

When a control signal for instructing to terminate recording is input from the recording controlling unit 16, the delay circuit 12 performs processing as follows. For example, it is supposed that an operation to terminate recording is to be performed at the completion of recording of the moving image data of the 11$^{th}$ block while the elapsed time Tk is shifting from the time T15 to the time T16 after a recording process has been started, beginning with the moving image data of the first block. In cooperation with the above mentioned operation, the delay circuit 12 outputs only an image the display time of which is the latest among images constituting the 11$^{th}$ block to the encoding circuit 17 when the elapsed time Tk reaches the time T16 as shown in FIG. 4. That is, the delay circuit 12 outputs only the image the display time of which is the latest among the moving image data constituting the 11$^{th}$ block to the encoding circuit 17 and terminates the recording process without outputting moving image data set at succeeding display times. The delay circuit 12 terminates the recording process in the above mentioned manner to prevent unnecessary moving image data from being recorded on the recording medium 181 using the recording unit 18.

The index generating circuit 13 generates a still image index from the moving image data DS output from the image pickup circuit 11 in accordance with the control signal CSdm and a control signal CSi1$m$ sent from the recording controlling unit 16 which will be described later. Then, the index generating circuit 13 supplies the generated still image index to the first image display circuit 14 in accordance with a control signal CSi2$m$ sent from the recording controlling unit 16 which will be described later.

Incidentally, the index generating circuit 13 adds time information defined on the basis of the inputting start time at which the delay circuit 12 starts inputting of moving image data to a still image index to be generated. For example, in the case that a still image index has been generated from moving image data which is managed using the delay circuit 12 as the 1-75$^{th}$ data, the index generating circuit 13 adds elapsed time information defined as [elapsed time Tk=Ti×74] to the still image index so generated. In addition, in the case that a still image index has been generated from moving image data which is managed using the delay circuit 12 as the 2-75$^{th}$ data, the index generating circuit 13 adds elapsed time information defined as [elapsed time Tk=Ti×164] to the still image index so generated.

The first image display circuit 14 displays moving image data which has been delayed in accordance with the control signal CSdm and supplied from the delay circuit 12 as the delayed moving image DL. The first image display circuit 14 also displays still image indexes supplied from the index generating circuit 13 in accordance with the control signal CSi2$m$ sent from the recording controlling unit 16 which will be described later. A touch panel 141 is incorporated into the first image display circuit 14 as an operation inputting unit configured to accept an operation instruction given from a user in accordance with a result of display. The first image display circuit 14 informs the recording controlling unit 16 of the control signal RC indicative of the operation instruction accepted from the user via the touch panel 141. Here, on the first image display circuit 14, an indication to start moving image data supply to the recording unit 18 and an indication to terminate moving image data supply to the recording unit 18 are displayed as operation instructions to be accepted from a user. On the first image display circuit 14, various settings which will be described later are also indicated as operation instructions to be accepted from a user. Incidentally, an operation instruction given from a user is not always input only using the touch panel 141 incorporated into the first image display circuit 14, but a user interface which will operate in cooperation with display information displayed on the first image display circuit 14 may be used as an operation inputting unit.

The second image display circuit 15 displays the moving image data DS output from the image pickup circuit 11 in real time.

The recording controlling unit 16 includes constitutional elements as follows such that a user confirms a moving image to be captured using the image pickup circuit 11 and the user makes the recording unit 18 record moving image data on the recording medium 181 with certainty. That is, the recording controlling unit 16 includes a first timer circuit 161, a second timer circuit 162, a third timer circuit 163 and a CPU 164.

The first timer circuit 161 generates an interrupt signal CSd used to inform the delay circuit 12 of a delay time at which delayed moving image data is output to the first image display circuit 14. The first timer circuit 161 supplies the generated interrupt signal CSd to the CPU 164.

The interrupt signal CSd is a timing signal indicative of time information counted up to a time Td indicative of an output start time at which the delayed moving image data DL is output from the delay circuit 12 to the first image display circuit 14, on the basis of a timing at which the moving image data DS is input from the image pickup circuit 11 into the delay circuit 12. The time Td is optionally set by a user, for example, using the touch panel 141 incorporated into the first image display circuit 14.

The second timer circuit 162 firstly counts up to a time (Ti−Tα) on the basis of the time at which the delay circuit 12 starts inputting moving image data and outputs an interrupt signal CSi1 used to inform the index generating circuit 13 that a still image index is to be generated to the CPU 164. Then, the second timer circuit 162 counts up to a time Ti and repeatedly outputs the interrupt signal CSi1 to the CPU 164. Here, the time Ti indicates a time interval during which a still image index is generated using the index generating circuit 13. The time Ti is optionally set by a user, for example, using the touch panel 141 incorporated into the first image display circuit 14, similarly to the above mentioned time Td. The time Tα is a time corresponding to a delay time taken until a still image index is selected using the touch panel 141 to perform a recording starting operation after a user has visually confirmed the delayed moving image DL displayed on the first image display circuit 14. That is, the time Tα is optionally set by a user within a range where a relation Ti>Tα is established or is designed to have an optimum value.

The third timer circuit 163 counts up to the time Ti on the basis of the time at which the delay circuit 12 starts inputting moving image data and repeatedly outputs an interrupt signal CSi2 used to inform the CPU 164 that a still image index is to be output from the index generating circuit 13.

The CPU 164 reads out a program used to, for example, perform a recording controlling process on a RAM not shown to control a recording process performed using the recording unit 18. The CPU 164 informs respective processing units of control signals CSdm, CSi1*m* and CSi2*m* on the basis of the interrupt signals CSd, CSi1 and CSi2 respectively supplied from the first timer circuit 161, the second timer circuit 162 and the third timer circuit 163.

The CPU 164 also controls the first image display circuit 14 and the second image display circuit 15 and, when a control signal RC is sent through the touch panel 141 incorporated into the first image display circuit 14, informs the delay circuit 12 of a control signal RCm.

The encoding circuit 17 compressively encodes moving image data supplied from the delay circuit 12 using a predictive encoding technique such as MPEG or a technique other than the predictive encoding technique and then supplies the compressively encoded moving image data to the recording unit 18.

The recording unit 18 records the compressively encoded moving image data supplied from the encoding circuit 17 on the recording medium 181. Here, the recording medium 181 may be, for example, a hard disk, a flash memory or an optical disk. The recording unit 18 may have the recording medium 181 built thereinto or may be detachably connected with the recording medium 181.

In the video camera 1 configured as mentioned above according to an embodiment of the present invention, the recording controlling unit 16 controls the first image display circuit 14 to display the delayed moving image DL which is to be on the recording medium 181 and which has been delayed using the delay circuit 12 and controls the recording unit 18 to record the moving image data delayed using the delay circuit 12 on the recording medium 18 in accordance with an operation instruction given from a user in accordance with a display result displayed on the first image display circuit 14. In the video camera 1, through execution of processing as mentioned above using the recording controlling unit 16, moving image data to be recorded is visually confirmed by a user and the moving image data so confirmed is recorded with certainty on the recording medium 181 in accordance with an operation instruction given from the user.

Figure 5:
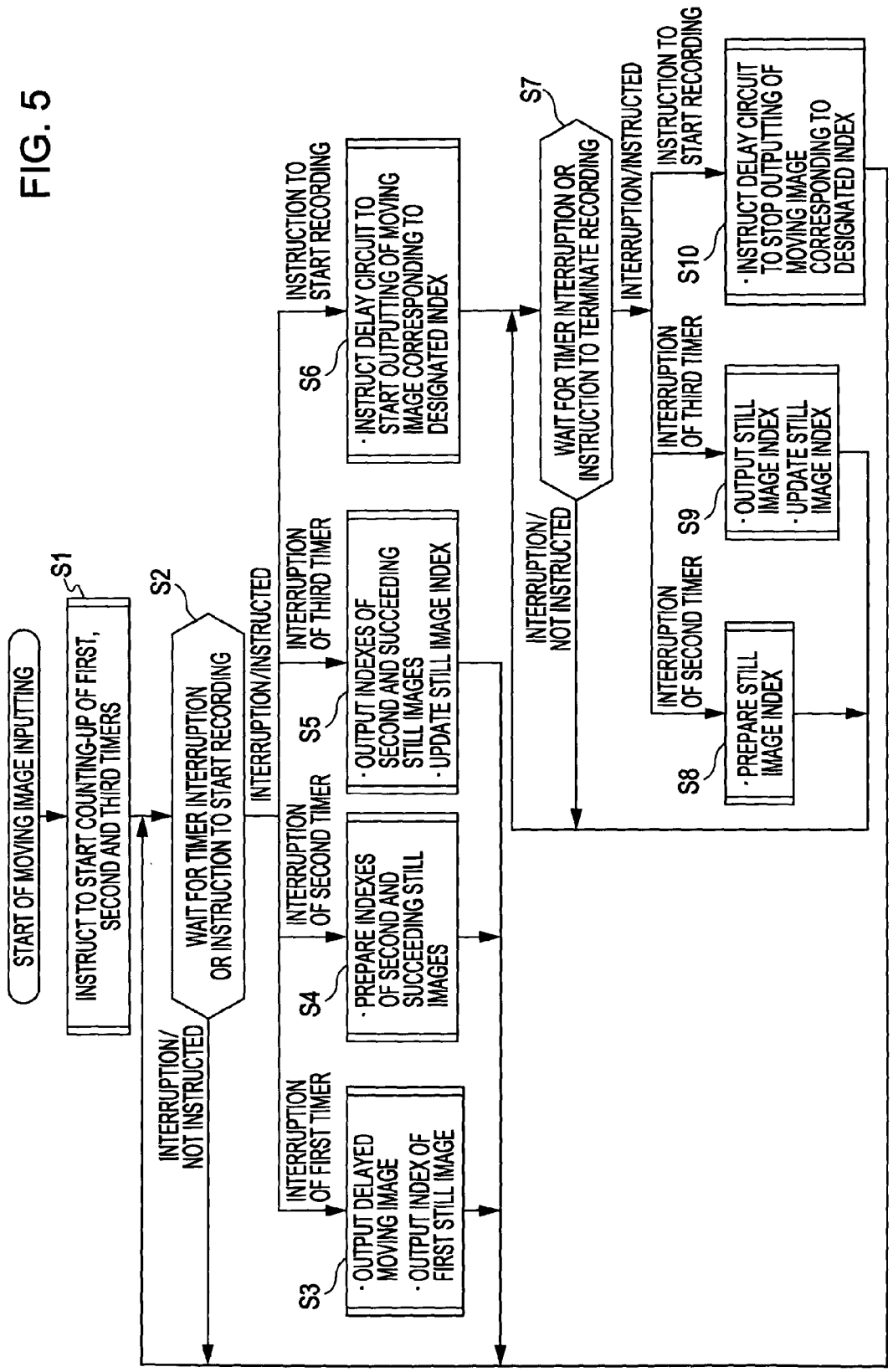
FIG. 5 is a flowchart illustrating steps of a recording controlling process concerning to a recording controlling unit.

In addition, in the video camera 1, by performing processing in accordance with a flowchart, in particular, as shown in FIG. 5, a user may start a recording process, beginning with moving image data corresponding to a plurality of still image indexes and may terminate the recording process so started. Thus, next, a recording controlling process to be performed in accordance with the flowchart as shown in FIG. 5 will be described.

First, in the video camera 1, in accordance with inputting of an operation from a user using the touch panel 141 incorporated into, for example, the first image display circuit 14, inputting of moving image data into the delay circuit 12 is started. For example, in the video camera 1, the power source of a camera main body is turned on under the operation by the user to select an operation mode in which an image of a subject is to be captured. Then, the image pickup circuit 11 is driven and inputting of the moving image data into the delay circuit 12 is started.

Figure 6:
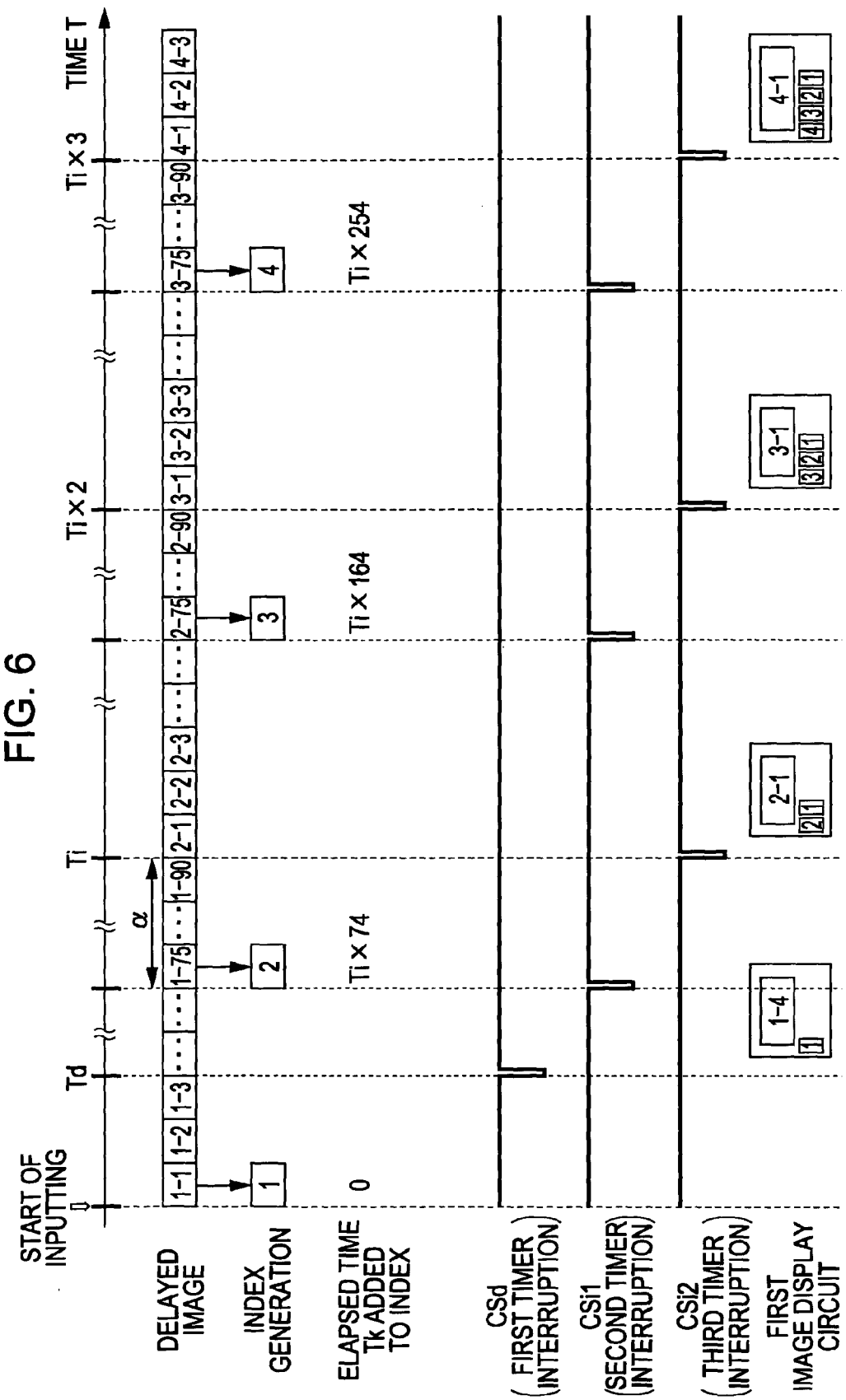
FIG. 6 is a timing chart illustrating an example of an operation performed before a recording process is started.

When inputting of the moving image data into the delay circuit 12 is started, the index generating circuit 13 generates the first static image index from moving image data which is 1-1stly input into the delay circuit 12, as shown by an operational example in FIG. 6. In addition, the index generating circuit 13 adds elapsed time information Tk=0 to the first static image index as related information. Then, when inputting of the moving image data is started, the CPU 164 incorporated into the recording controlling unit 16 starts processing at step S1.

At step S1, the CPU 164 instructs the first timer circuit 161, the second timer circuit 162 and the third timer circuit 163 to count time information after execution of initialization processing. That is, the CPU 164 instructs the first timer circuit 161, the second timer circuit 162 and the third timer circuit 163 to set time information to zero so as to set information on times counted until respective interrupt signals are output.

At step S2, the CPU 164 waits until the interrupt signals CSd, CSi1 and CSi2 are sent from the first timer circuit 161, the second timer circuit 162 and the third timer circuit 163, or a control signal RC is sent from the first image display circuit 14.

In a wait state at step S2, when the interrupt signal CSd is sent from the first timer circuit 161, the CPU 164 proceeds to processing at step S3. When the interrupt signal CSi1 is sent from the second timer circuit 162, the CPU 164 proceeds to processing at step S4. When the interrupt signal CSi2 is sent from the third timer circuit 163, the CPU 164 proceeds to processing at step S5. When the control signal RC is sent from the first image display circuit 14, the CPU 164 proceeds to processing at step S6.

Figure 7A:
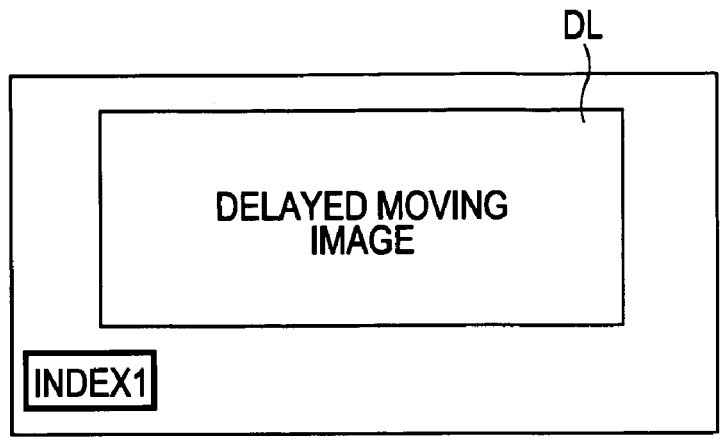
FIGS. 7A to 7C are diagrams showing display examples displayed on a first image display circuit.

At step S3, the CPU 164 controls the delay circuit 12 to output a delayed moving image DL to the first image display circuit 14, for example, as shown in FIG. 6. The CPU 164 also controls the index generating circuit 13 to output a firstly generated still image index to the first image display circuit 14 to be displayed thereon at a timing corresponding to that of the interrupt signal CSd. For example, the first image display circuit 14 displays the delayed moving image DL on an upper part of its screen and the firstly generated still image index INDEX1 on a left lower part of the screen, for example, as shown in FIG. 7A. Then, the CPU 164 returns to the processing at step S2.

In this situation, the first image display circuit 14 displays neither the delayed moving image DL nor the still image index until the processing at step S3 is performed after inputting of moving image data using the delay circuit 12 has been started. Thus, it is difficult for a user to start a recording process by visually confirming information displayed on the first image display circuit 14. However, the CPU 164 controls the second image display circuit 15 to display the moving image data DS generated in real time from the image pickup circuit 11, thereby to allow to start the recording process by accepting an operation instruction given in accordance with information displayed and output from the second image display circuit 15 even while the first image display circuit 14 is not displaying and outputting any information.

At step S4, the CPU 164 controls the index generating circuit 13 to generate still image indexes from the moving image data DS output from the image pickup circuit 11 at a timing corresponding to that of the interrupt signal CSi1. For example, as shown in FIG. 6, the index generating circuit 13 generates a second still image index INDEX2 from moving image data that the delay circuit 12 inputs 1-75thly. In addition, the index generating circuit 13 adds elapsed time information Tk=Ti×74 to the second still image index INDEX2. Then, the CPU 164 returns to the processing at step S2.

Figure 7B:
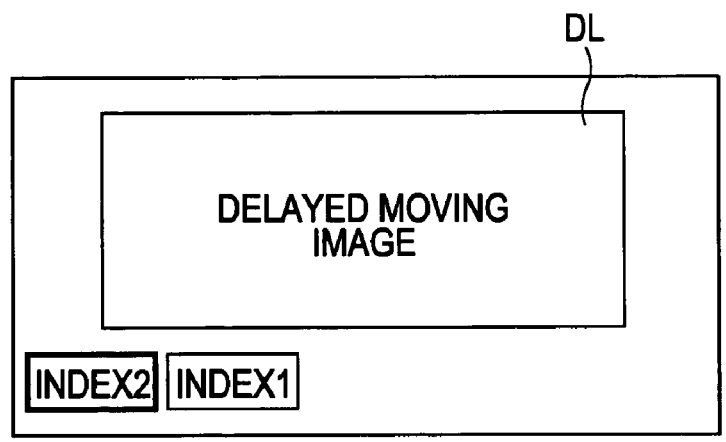

At step S5, the CPU 164 controls the index generating circuit 13 to output a secondarily generated still image index and still image indexes which have been successively generated following the secondarily generated still image index at step S4 to the first image display circuit 14 at a timing corresponding to that of the interrupt signal CSi2. The CPU 164 also controls the first image display circuit 14 to update the display of still image indexes. That is, the first image display circuit 14 displays still image indexes so as to be arrayed in time order in which the still image indexes are displayed in time series (hereinafter, referred to as "in display time order") corresponding to the display time of the moving image data. For example, the first image display circuit 14 changes its screen such that the latest still image index INDEX2 is arranged on a lower left end part of the screen and the still image index INDEX1 which has been formerly displayed on a lower left end part of a screen shown in FIG. 7A is shifted rightward to be displayed as shown in FIG. 7B. The first image display circuit 14 frames only the latest still image index INDEX2 to emphasize its existence so as to clearly show a user the position of the latest still image index among the still image indexes arrayed in display time order. As an alternative, the first image display circuit 14 may perform image processing such as large-sizing of only the latest still image index among the still image indexes arrayed in display time order so as to clearly show a user the position of the latest still image index, in place of the above mentioned processing to frame the latest still image index. Then, the CPU 164 returns to the processing at step S2.

In the above mentioned manner, the CPU 164 outputs the control signals CSi1 and CSi2 in this order until the processing at step S6 is executed. In cooperation with the above mentioned output processing, the first image display circuit 14 displays still image indexes corresponding to moving image data delayed using the delay circuit 12 so as to be arrayed in display time order. Moving image data obtained after the display time corresponding to the latest still image index among the still image indexes arrayed in display time order is supplied from the delay circuit 12 to the first image display circuit 14 to be displayed as the delayed moving image DL.

Figure 7C:
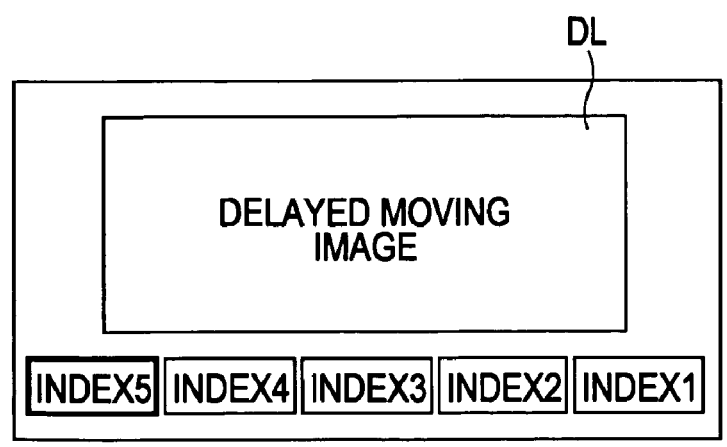

For example, by repeatedly performing the processing at step S5, the first image display circuit 14 displays the still image indexes arrayed in display time order of INDEX5, INDEX4, INDEX3, INDEX2 and INDEX1 from the left end toward the right end on a lower part of its screen as shown in FIG. 7C. Then, every time the processing at step S5 is repeated, the first image display circuit 14 deletes the oldest still image index among the indexes arrayed in display time order and changes its screen so as to display respective still image indexes set at new display times so as to be arrayed in display time order. As a specific example, in the case that the oldest still image index is INDEX1, the first image display circuit deletes INDEX1 and displays five still image indexes, in all, arrayed in display time order of INDEX6, INDEX5, INDEX4, INDEX3 and INDEX2 from the left end toward the right end on the lower part of its screen.

At step S6, the CPU 164 controls the delay circuit 12 to start outputting of delayed moving image data corresponding to time information indicated by the control signal RC, that is, time information added to a still image index selected by a user to the encoding circuit 17.

Figure 8:
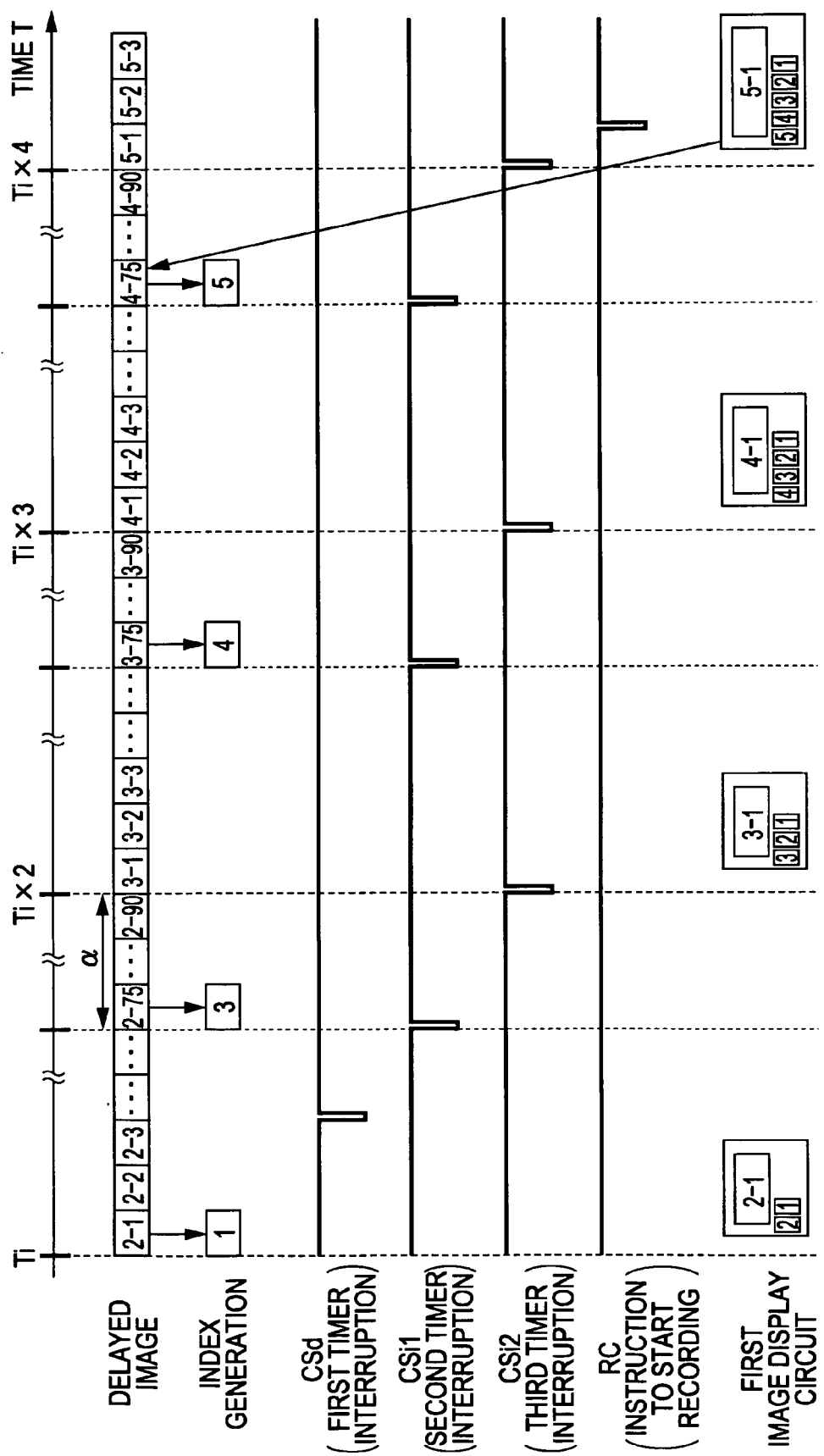
FIG. 8 is a timing chart illustrating an example of an operation performed upon execution of a recording process.

FIG. 8 shows an operational example in which when the moving image data that the delay circuit 12 has obtained 5-1stly is being displayed on the first image display circuit 14 as the delayed moving image DL, the fifth still image index has been selected by a user as an object from which recording is started. In the example, on the touch panel 141, each still image index displayed on the first image display circuit 14 is depressed by a user to specify an image as an object from which recording is started and information on a specified still image index is supplied to the recording controlling unit 16 as a control signal RC. Then, when the control signal RC corresponding to the operation executed by the user is input into the CPU 164, the delay circuit 12 supplies moving image data, beginning with 4-75thly input moving image data corresponding to the time information added to the still image index selected as the object from which recording is started to the encoding circuit 17.

In the above mentioned manner, the CPU 164 allows to start the recording process in consideration of a time corresponding to a delay time taken until a still image index is selected to perform operations to start recording after a user has visually confirmed the delayed moving image DL displayed on the first image display circuit 14. As an alternative, the CPU 164 may supply moving image data delayed using the delay circuit 12 to the recording unit 18 via the encoding circuit 17 in accordance with the control signal RC, beginning with moving image data obtained before a display time corresponding to a still image index selected by a user and after a display time corresponding to a still image index situated directly before the still image index so selected. That is, in the operational example shown in FIG. 8, the CPU 164 may control the delay circuit 12 to output moving image data to the encoding circuit 17, beginning with optionally selected moving image data situated between the 4-75$^{th}$ data and the 3-74$^{th}$ data.

The process of recording the moving image data is started in the above mentioned manner and then the CPU 164 proceeds to processing at step S7.

At step S7, the CPU 164 waits until interrupt signals CSi1 and CSi2 are informed from the second timer circuit 162 and the third timer circuit 163 or a control signal RC used to terminate the recording process is informed from the first image display circuit 14.

In a standby state at step S7, when the interrupt signal CSi1 is sent from the second timer circuit 162, the CPU 164 proceeds to processing at step S8. When the interrupt signal CSi2 is sent from the third timer circuit 163, the CPU 164 proceeds to processing at step S9. When the control signal RC is sent from the first image display circuit 14, the CPU 164 proceeds to processing at step S10.

At step S8, the CPU 164 controls the index generating circuit 13 to generate a still image index from moving image data DS output from the image pickup circuit 11 at a timing corresponding to that of the interrupt signal CSi1. Then, the CPU 164 returns to the processing at step S7.

At step S9, the CPU 164 controls the index generating circuit 13 to output the secondarily generated still image index and the still image indexes which have been generated successively following the secondarily generated still image index at step S4 to the first image display circuit 14 at a timing corresponding to that of the interrupt signal CSi2. The CPU 164 also controls the first image display circuit 14 to change the display of still image indexes corresponding to moving image data set at a new display time. Then, the CPU 164 returns to the processing at step S7.

At step S10, the CPU 164 controls the delay circuit 12 to output data of up to delayed moving image data corresponding to the time information indicated by the control signal RC, that is, the time information added to the still image index selected by the user to the encoding circuit 17 and then to terminate outputting of further data.

Figure 9:
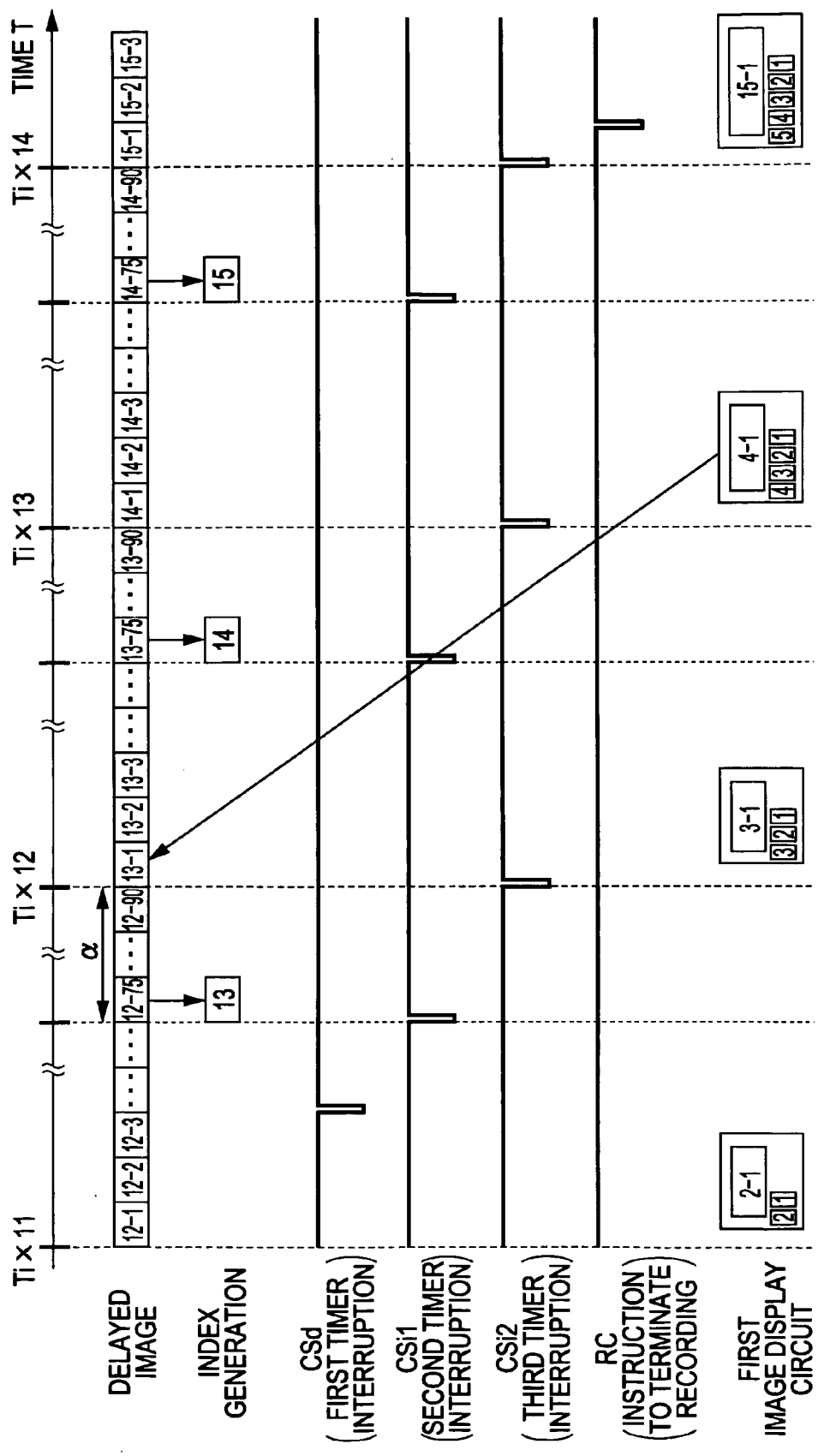
FIG. 9 is a timing chart illustrating an example of an operation performed at the completion of execution of a recording process.

FIG. 9 shows an operational example in which when moving image data which has been 14-1stly input into the delay circuit 12 is being displayed on the first image display circuit 14 as the delayed moving image DL, the 13$^{th}$ still image index has been selected by a user as an object from which recording is started. In the example shown in FIG. 9, on the touch panel 141, each still image index displayed on the first image display circuit 14 is depressed by a user to specify an image as an object after which recording is terminated and information on a specified still image index is supplied to the recording controlling unit 16 as a control signal RC. When the control signal RC corresponding to the above mentioned operation performed by the user is input into the CPU 164, the delay circuit 12 supplies 13-1stly input moving image data corresponding to the time information added to the still image index to the encoding circuit 17 and then terminates supply of the moving image data RD to the encoding circuit 17. In the above mentioned manner, the CPU 164 terminates the process of recording the moving image data and returns to the processing at step S2.

In the video camera 1, the CPU 164 controls the first image display circuit 14 to display still image indexes corresponding to moving image data delayed using the delay circuit 12 so as to be arrayed in display time order in the above mentioned manner. Then, in the video camera 1, in response to an operation instruction given to select one still image index from several still image indexes, moving image data delayed using the delay circuit 11 is supplied to the recording unit 18, beginning with moving image data obtained before a display time corresponding to the still image index so selected and after a display time corresponding to a still image index situated directly before the still image index so selected. By performing processing as mentioned above, the video camera 1 allows a user to start recording of data, beginning with moving image data corresponding to a plurality of still image indexes and as a result of which, the video camera 1 allows to provide the user of an operational environment in which a captured image that the user wishes to record is recorded on the recording medium with certainty. In addition, in the video camera 1, in cooperation with depression of a display position of each still image index displayed on the first image display circuit 14, the touch panel 141 operates to output the control signal RC in accordance with which the depressed still image index is selected as an object from which recording is started or after which recording is terminated. The touch panel 141 operates to output the control signal RC in the above mentioned manner, so that the video camera 1 allows to provide the user of an operational environment in which a still image index to be selected as an object from which recording is started or after which recording is terminated is readily specified.

In the video camera 1, the CPU 164 controls the first image display circuit 14 to display still image indexes corresponding to moving image data delayed using the delay circuit 12 so as to be arrayed in display time order. Then, in the video camera 1, the delay circuit 12 is controlled to output data of up to delayed moving image data corresponding to time information indicated by the control signal RC, that is, time information added to a still image index selected by a user to the encoding circuit 17 and to terminate further data outputting. By performing processing as mentioned above, the video camera 1 allows a user to terminate recording after data of up to moving image data corresponding to a plurality of still image indexes has been recorded. As a result, moving image data which may be unnecessary to a user is prevented from being recorded on the recording medium 181. Although, in the above mentioned example, images are displayed using two display circuits, that is, the first image display circuit 14 and the second image display circuit 15, as an alternative, images to be originally displayed on the both display circuits may be displayed on a single display.

Figure 10:
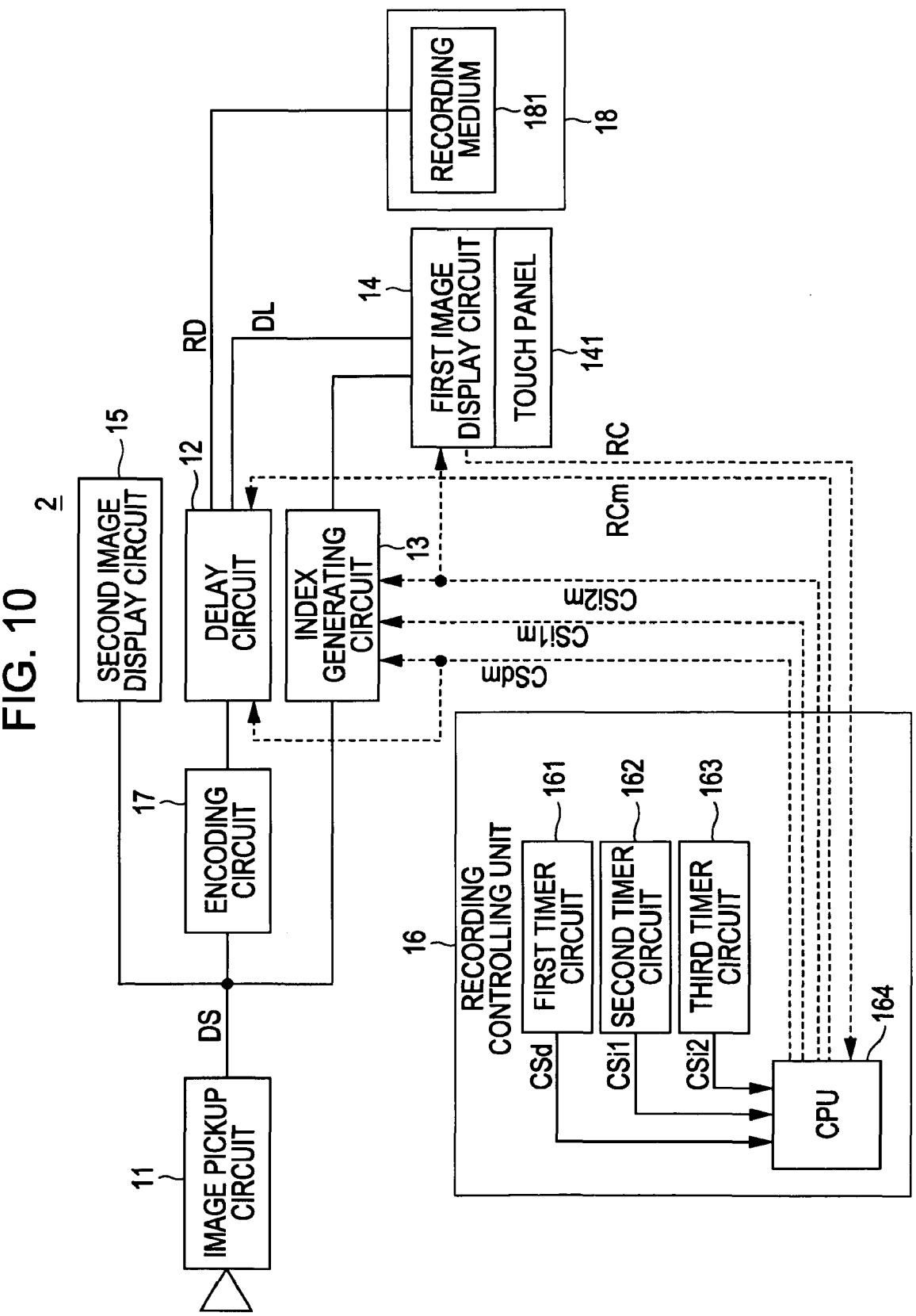
FIG. 10 is a structural diagram of a video camera into which a recording controlling device according to an embodiment of the present invention is incorporated.

As another embodiment of the above mentioned video camera 1, a video camera 2 as shown in FIG. 10 may be used.

As shown in FIG. 10, the video camera 2 according to another embodiment of the present invention is configured such that the encoding circuit 17 is connected between the image pickup circuit 11 and the delay circuit 12. The video camera 2 is configured in the same manner as the video camera 1 except that the encoding circuit 17 is connected in the above mentioned positional relation. Thus, the description of structures of respective processing units constituting the video camera 2 will be omitted.

In the video camera 2 so configured, the encoding circuit 17 compressively encodes moving image data generated using the image pickup circuit 11 and supplies the compressively encoded moving image data to the delay circuit 12. In the video camera 2, the compressively encoded moving image data is supplied to the delay circuit 12 in the above mentioned manner, so that the memory capacity of a memory circuit configured to hold moving image data to be delayed using the delay circuit 12 is reduced.

The present invention has been described using the video cameras 1 and 2 as mentioned above as examples. However, it should be understood by those skilled in the art that the present invention is not limited to the above mentioned embodiments, but various modifications, combinations, sub-combinations and alterations may occur depending on design requirements and other factors insofar as they are within the scope of the appended claims or the equivalents thereof. For example, broadcast signals transmitted in real time and video signals transmitted from a remotely located video camera may be received and made conformable with a recording controlling device configured to perform a recording process to be executed on a recording medium and an operation environment in which moving image data that a user wishes to record on a recording medium is recorded on the recording medium with certainty may be provided.

What is claimed is:

1. A recording controlling device comprising:
    a display controlling unit configured to display moving image data delayed using a delay circuit on a first display unit and to display on the first display unit delayed still images, each of the delayed still images being set at a respective display time so as to be arrayed in time order and corresponding to a different block of the moving image data delayed using the delay circuit; and
    a recording controlling unit configured to record a particular block of the moving image data delayed using the delay circuit on a recording medium in accordance with an operation instruction selecting a given corresponding delayed still image displayed on the first display unit,
    wherein the display controlling unit performs control so as to display simultaneously on the first display unit (i) one or more blocks of the moving image data delayed using the delay circuit, and (ii) one or more of the corresponding delayed still images for selection in accordance with the operation instruction.

2. The recording controlling device according to claim 1, wherein the recording controlling unit performs control so as to record, on the recording medium, moving image data obtained before a display time corresponding to the given corresponding delayed still image selected in accordance with the operation instruction and after a display time corresponding to a previous delayed still image situated directly before the given corresponding delayed still image so selected based on the operation instruction.

3. The recording controlling device according to claim 2, wherein the display controlling unit changes display content at each predetermined time so as to display, on the first display unit, respective delayed still images set at new display times and corresponding to different blocks of the moving image data delayed using the delayed circuit so as to be arrayed in time order.

4. The recording controlling device according to claim 2, wherein the display controlling unit performs control so as to display, on the first display unit, another different block of the moving image data obtained after a display time corresponding to the latest delayed still image among the delayed still images arrayed in time order in which the delayed still images are to be displayed on the first display unit.

5. The recording controlling device according to claim 4, wherein the display controlling unit performs control so as to display the particular block of the moving image data input into the delay circuit and being recorded on the recording medium based on selection of the given corresponding delayed still image on a second display unit.

6. A recording controlling method comprising the steps of:

displaying blocks of delayed moving image data on a display unit and displaying on the display unit delayed still images, each of the delayed still images being set at a respective display time so as to be arrayed in time order and corresponding to a different block of the delayed moving image data; and recording, on a recording medium, a particular block of the delayed moving image data in accordance with an operation instruction selecting a given corresponding delayed still image displayed on the display unit, wherein the displaying steps include displaying simultaneously on the display unit (i) one or more blocks of the moving image data delayed using the delay circuit, and (ii) one or more of the corresponding delayed still images of selection in accordance with the operation instruction.

7. A computer-readable medium having stored thereon a program configured to make a computer execute a recording controlling method comprising the steps of:

displaying blocks of delayed moving image data on a display unit and displaying on the display unit delayed still images, each of the delayed still images being set at a respective display time so as to be arrayed in time order and corresponding to a different block of the delayed moving image data; and recording, on a recording medium, a particular block of the delayed moving image data in accordance with an operation instruction selecting a given corresponding delayed still image displayed on the display unit, wherein the displaying steps include displaying simultaneously on the display unit (i) one or more blocks of the moving image data delayed using the delay circuit, and (ii) one or more of the delayed still images for selection in accordance with the operation instruction.

8. A recording device comprising:

a recording unit configured to record moving image data on a recording medium;

a delaying unit configured to delay moving image data input as an object to be recorded on the recording medium;

a display controlling unit configured to display blocks of the moving image data delayed using the delaying unit on a first display unit and to display on the first display unit delayed still images, each of the delayed still images being set at a respective display time so as to be arrayed in time order and corresponding to a different block of the moving image data delayed using the delaying unit; and a recording controlling unit configured to control the recording unit to record, on the recording medium, a particular block of the moving image data delayed using the delaying unit in accordance with an operation instruction given from a user selecting a given corresponding delayed still image displayed on the first display unit, wherein the display controlling unit performs control so as to display simultaneously on the first display unit (i) one or more blocks of the moving image data delayed using the delay circuit, and (ii) one or more of the delayed still images for selection in accordance with the operation instruction given by the user.

\* \* \* \* \*